Sheet 1
2 Sheets
F. B. Hunt.
Straw-Cutter.
No. 2838 Reissued Jan. 14, 1868.
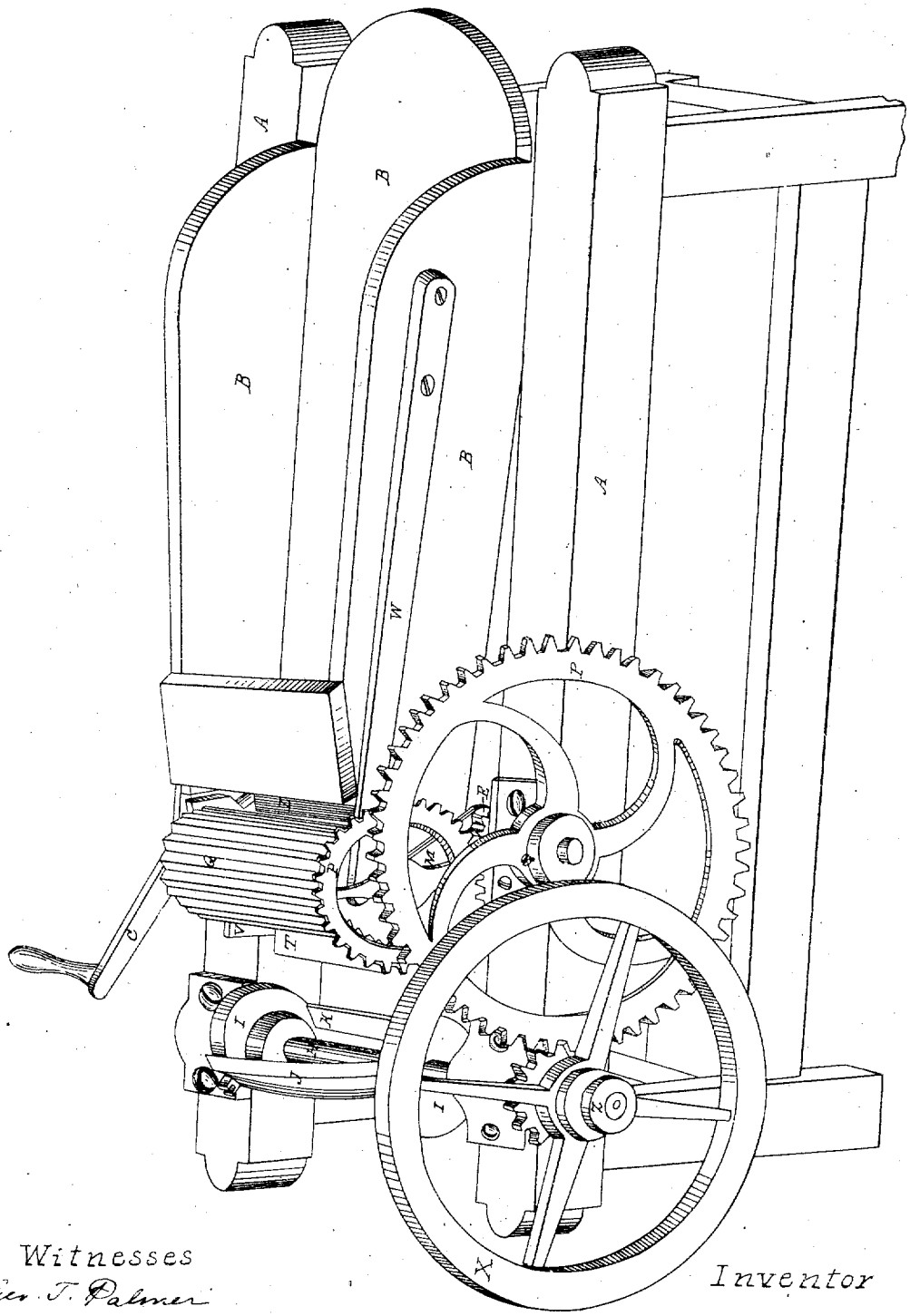
Witnesses
Geo. T. Palmer
Chas Levis
Inventor
Franklin B. Hunt 2 Sheets
Sheet-2.
F. B. Hunt.
Straw-Cutter.
No. 2838 Reissued Jan. 14, 1868.
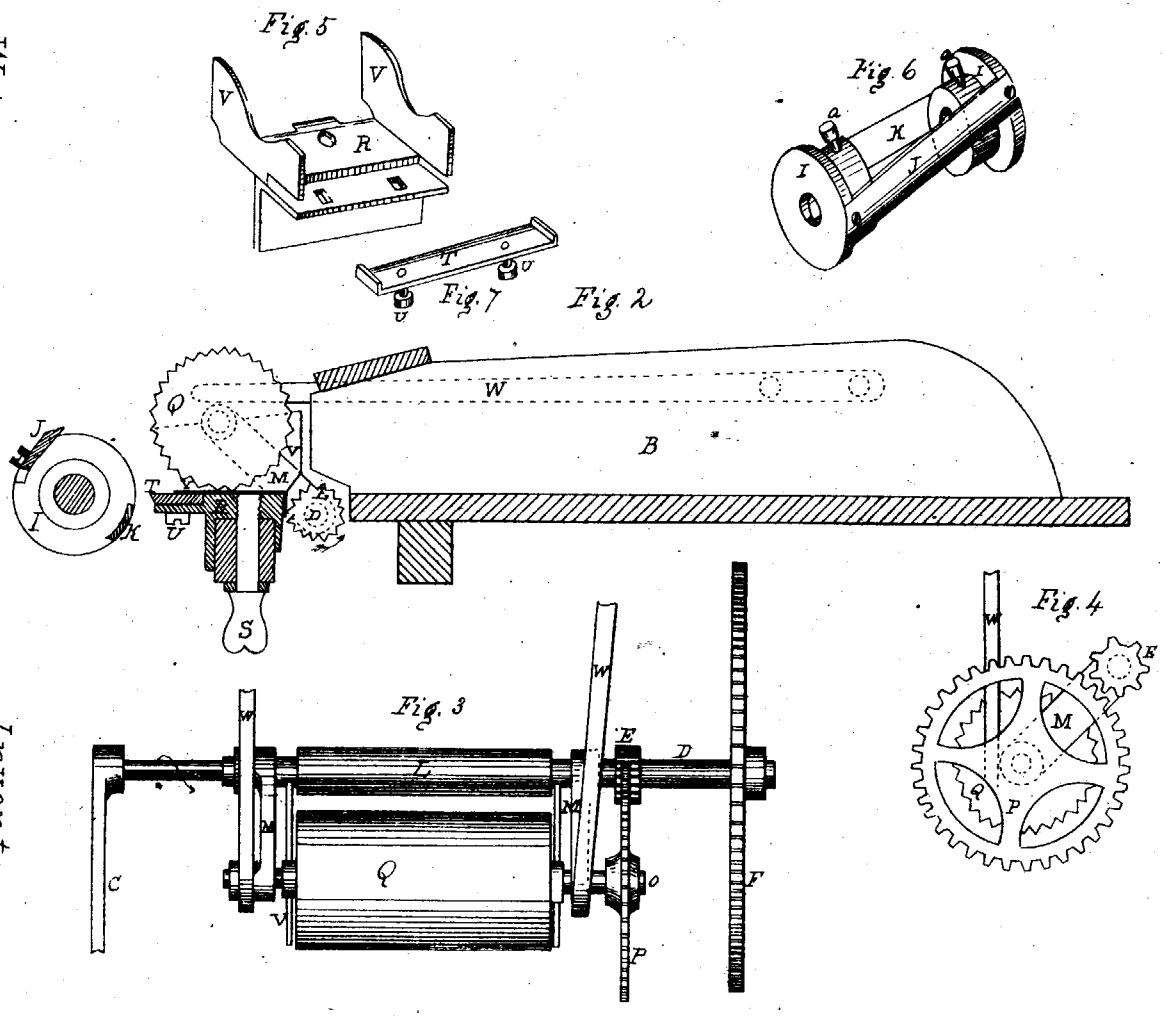
Witnesses
Geo. T. Palmer
Chas Levins
Inventor
Franklin B. Hunt

United States Patent Office.

FRANKLIN B. HUNT, OF RICHMOND, INDIANA, ASSIGNEE BY MESNE ASSIGNMENTS OF HIMSELF.

*Letters Patent No.* 26,637, *dated December* 27, 1859; *reissue No.* 2,838, *dated January* 14, 1868.

IMPROVEMENT IN STRAW-CUTTERS.

The Schedule referred to in these Letters Patent and making part of the same.

TO ALL WHOM IT MAY CONCERN:

Be it known that I, FRANKLIN B. HUNT, of Richmond, in the county of Wayne, in the State of Indiana, have invented certain new and useful Improvements in Machines for Cutting Straw-Stalks, &c.; and I do hereby declare that the following is a full, clear, and exact description thereof, reference being had to the accompanying drawings, and to the letters of reference marked thereon.

Like letters in the different figures represent corresponding parts. In the drawings—

Figure 1 is a perspective view of a straw-cutter, showing my improvements therein.

Figure 2 is a central vertical longitudinal section of a part of the machine.

Figure 3 is a plan of the feeding-device.

Figure 4 is a side view.

Figure 5 shows the bed-piece, bearing-plate, and side plates, combined in one piece.

Figure 6 is a perspective view of the knife-bearings, showing the knife attached thereto, and the frictional set-screws.

Figure 7 is a perspective view of the adjustable bar against which the knife cuts.

To enable others skilled in the art to make my invention, I will proceed to describe the parts, and their operation.

A is the frame of the machine. B is the feeding-trough. C is a crank for operating the machine, and is fast to the shaft D. On shaft D are the pinion E and wheel F. Wheel F works into pinion G, on the shaft H, to communicate motion to the cutting-knife. The knife J is secured to the cylinder, composed of the parts I I and K, by means of screws. The cylinder to which the knife J is attached is loose upon the shaft H, but is made sufficiently fast thereto, by means of set-screws *a a*, (which are clearly shown in fig. 6,) to withstand all ordinary resistance presented by the feed when passing under the knife. On shaft D is secured a fluted roll or cylinder, L. On shaft D is also fitted one end of each of the two links M. The opposite ends of these links form the bearings for and carry the shaft O. On shaft O is the gear-wheel P, which works into and is driven by the pinion E, so giving motion to the fluted cylinder Q, on shaft O. The bed-piece R, with its bearing-plate for the cutter-bar T, and side pieces V V, are made in one piece or casting, and are secured to their support by the screws S. The cutter-bar T is secured to its seat on the bed-piece R by means of vertical screws U, passing through slots in said seat, the screw-bolts U securing said adjustable bar within the limits of the width of the throat of the feed-box, thereby making a more solid bearing for the cutting-knife to act upon than would be the case if said adjustable bar were secured to the outside framework of the machine. The springs W press upon the upper ends of the link-bearings M, and so keep the feed-roller or cylinder Q pressed down into contact with the straw or other material passing under it. These springs W yield upward, to allow the free passage of the ever-varying thickness of material passing under the roll, Q. The motion of the roll, Q, up and down, is through the arc of a circle, whose centre is the axis of shaft D, the effect of which is to shorten the operative length of the springs W whenever a large quantity of material passes under the roll Q, so increasing their effect at the proper time. The red line marked Y is a zinc plate, which covers the joint between the adjustable bar T and the bed-piece R, in order to make a smooth surface, over which the straw or other material passes to the cutting-action of the knife. X is a fly-wheel, which is fitted on the shaft H, and held in place by the screw-nut Z, sufficiently tight to resist slipping on the shaft H by any ordinary cutting-action of the knife upon the feed. The object of the knife-cylinder and the fly-wheel being fitted loosely on their shaft is for the purpose of allowing either of them to slip upon the shaft H when the knife meets with an unusual obstruction, such as a large stick, bone, or other foreign substance, mixed with the feed to be cut, or when an overcrowding of corn-stalks is forced between the knife and cutter-bar, the knife being allowed thereby to suddenly stop, and the fly-wheel to continue to revolve, and expend its momentum in a gradual manner.

Having thus described my improved straw and stalk-cutter, the operation is as follows: Motion is given to the shaft D, by means of crank C, in the direction indicated by the arrows in figs. 2 and 3. By means of pinion E and wheel P, a reverse motion is communicated to roll Q, and also, by means of pinion and wheel G F, to shaft H and the cutter-cylinder. The straw or other material to be cut is now placed in the trough B, and is carried forward by the rolls L and Q, and, passing over the cutter-bar T, is cut by the revolving knife J. Should the knife J meet with an unusual resistance, so as to endanger the parts of the machine, the knife-cylinder or fly-wheel, or both, should be so tightened to the shafts as to hold firmly when performing its ordinary work, and to easily slip upon the shaft when an unusual resistance is offered to the knife, as previously described.

I do not wish it to be understood, by anything herein described or claimed, that I intend to debar, or claim any right to interfere with, any person, having a straw-cutter made with a cylinder of cutting-knives, from removing any number of said knives for the purpose of changing the length of the material cut. My machine is peculiarly adapted, in all the working parts thereof, to the use of a single cutting-knife, and, if a change of feed is required, I prefer to accomplish that object by other and more suitable means.

Having thus described the operation of my improved straw-cutter, what I claim, is—

1. Combining in one piece the bed-piece R, upon which the adjustable bar T rests, and the side pieces V V, substantially as shown and described.

2. The adjustable bar T, against which the knife cuts, when secured, by vertical bolts U, to an immovable bearing within the limits of the width of the cutting-knife, as shown.

3. The plate Y, for the purpose of covering the joint between the adjustable bar T, against which the knife cuts, and the bed-piece R, in manner substantially as set forth.

4. The link-bearings M, attached to the shaft D, and carrying the feed-roll Q, in combination with the springs W, in such manner that, as the roll rises, it shortens the operative length of the springs, and thereby gives the greatest pressure to the roll when most needed, in manner substantially as shown.

5. Attaching the fly-wheel of a feed-cutter to its shaft in such manner as to constitute a yielding-device between said wheel and the cutting-knife, for the purpose described.

6. Attaching the knife-cylinder of a feed-cutter to its shaft in manner shown, or in an equivalent way, to constitute a yielding-device between the knife and other parts of the machine, for the purpose herein shown and set forth.

FRANKLIN B. HUNT.

Witnesses:

GEORGE T. PALMER,

CHAS. LEWIS.